UNITED STATES PATENT OFFICE.

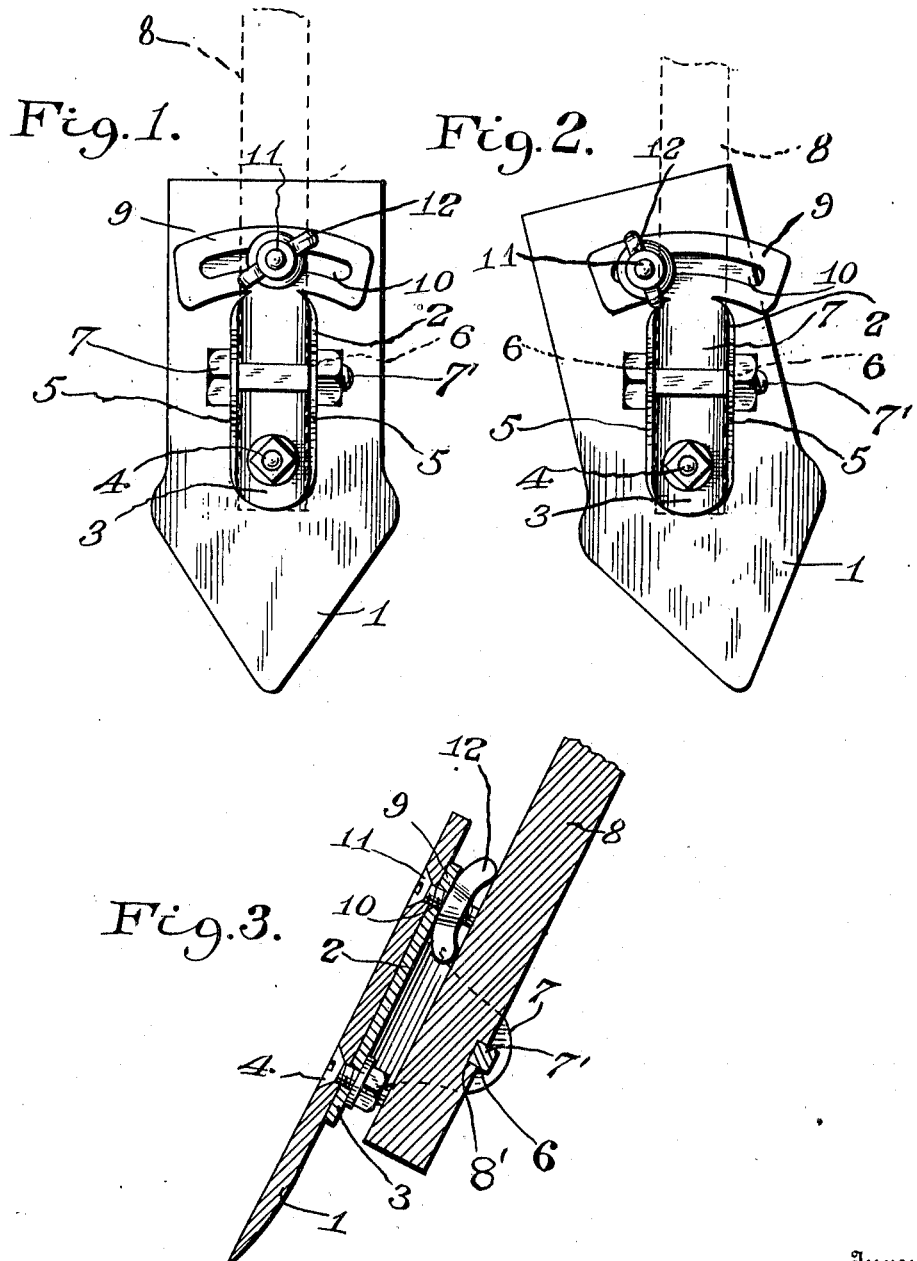

LEWIS BENJABIN KATTERHENRY, OF GARNER, IOWA.

CULTIVATOR-SHOVEL.

1,099,304.  Specification of Letters Patent. Patented June 9, 1914.

Application filed December 7, 1912. Serial No. 735,495.

*To all whom it may concern:*

Be it known that I, LEWIS B. KATTERHENRY, a citizen of the United States, residing at Garner, in the county of Hancock and State of Iowa, have invented certain new and useful Improvements in Cultivator-Shovels, of which the following is a specification, reference being had to the accompanying drawings.

This invention relates to new and useful improvements in cultivator shovels and more particularly to the means for fastening the shovel or blade to the cultivator standard, the object of the invention being to provide a fastening which permits the shovel to be set at various angles according to the nature of the work required and the condition of the ground and plants.

Another object of the invention is to provide a device of this character which will possess advantages in points of efficiency and durability, is inexpensive to manufacture and at the same time is simple in construction and operation.

With the above and other objects in view, the invention consists in the novel features of construction and the combination and arrangement of parts to be hereinafter more fully described, pointed out in the claim and shown in the accompanying drawings in which, Figure 1 is a rear elevation of a cultivator shovel constructed in accordance with my invention. Fig. 2 is a similar view showing the shovel adjusted in an angle to the standard. Fig. 3 is a vertical sectional view.

Referring more particularly to the drawings, 1 indicates the blade or shovel which is secured to the cultivator by means of the plate 2 upon the rear face of the shovel. The plate 2 comprises a body portion having at its lower side a downwardly extending portion 3 which is pivotally secured to the shovel 1 by means of a bolt 4. Extending outwardly from each side of the body of the plate 2 are the ears 5 which are provided with openings.

It will be apparent from the illustration disclosed in Fig. 3 that the shank 8 is provided adjacent its lower end with a transverse recess 8′ which is adapted to receive the bolt 7 when the same has been arranged within the openings 6. It will be apparent from this arrangement that the shank 8 will be securely held against any longitudinal movement with respect to the blade 1.

The body of the plate 2 is provided at its upper end with an arcuate extension 9 having a similar shaped slot 10 formed therein. Centrally arranged within the upper end of the cultivator shovel 1 is a bolt 11 which extends through to the rear of the shovel and is arranged within the arcuate slot 10, said bolt being moved within the slot according to the adjustment of the shovel. A winged nut 12 is threaded upon the inner end of the bolt 11 whereby the tightening of the nut will hold the shovel in various adjusted positions.

From the above, it will be seen that the cultivator shovel 1 may be adjusted from side to side and disposed at various angles according to the nature of the work required. It will also be apparent that the cultivator shovel may be readily removed to be replaced by a new one by simply removing the bolts 4 and 11.

From the above description taken in connection with the accompanying drawings, it will be readily apparent that I have provided a new and useful device whereby the cultivator shovel may be adjusted to various angles and whereby the same may be quickly removed or secured to the standards of the cultivator and it will also be apparent that the device is extremely simple in construction and can be manufactured at a comparatively low cost.

While I have shown and described the preferred form of my invention, it will be obvious that various changes in the details of construction and in the proportions may be resorted to for successfully carrying my invention into practice without sacrificing any of the novel features or departing from the scope of the appended claim.

What I claim is:—

The combination with a cultivator shovel and a standard having a transverse recess formed in one face thereof adjacent its lower end, of a plate provided at its lower edge with an extension which is pivotally secured to the cultivator shovel, ears extending outwardly from each side of the plate and provided with alined openings, a bolt disposed in said openings to clamp the plate to the standard, the intermediate portion of said bolt being arranged within the transverse recess to prevent longitudinal movement of the standard, relative to the blade, an arcuate extension formed integral with the upper edge of the plate and having a similar shaped slot therein, a bolt passing through the cultivator shovel and arranged within said slot, and a wing nut threaded upon the inner end of said bolt whereby the cultivator shovel may be readily adjusted to various positions with respect to the shank and securely held in its adjusted position.

In testimony whereof I hereunto affix my signature in the presence of two witnesses.

LEWIS BENJABIN KATTERHENRY.

Witnesses:
S. S. WILLIAMSON,
N. J. NELSON.

Copies of this patent may be obtained for five cents each, by addressing the "Commissioner of Patents, Washington, D. C."